(12) United States Patent
Bortolami et al.

(10) Patent No.: US 11,508,086 B2
(45) Date of Patent: Nov. 22, 2022

(54) IMAGE BASED ESTIMATION OF AERIAL PLATFORM ORIENTATION IN ROLL AND PITCH

(71) Applicant: BAE Systems Information and Electronic Systems Integration Inc., Nashua, NH (US)

(72) Inventors: Simone B. Bortolami, Belmont, MA (US); Helen F. Webb, Malden, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 16 days.

(21) Appl. No.: 17/087,999

(22) Filed: Nov. 3, 2020

(65) Prior Publication Data

US 2022/0138981 A1 May 5, 2022

(51) Int. Cl.
*G06T 7/73* (2017.01)
*G01C 23/00* (2006.01)
*G06T 7/11* (2017.01)

(52) U.S. Cl.
CPC ............... *G06T 7/73* (2017.01); *G01C 23/00* (2013.01); *G06T 7/11* (2017.01); *G06T 2207/10036* (2013.01)

(58) Field of Classification Search
CPC ... G06T 7/73; G06T 7/11; G06T 2207/10036; G01C 23/00
See application file for complete search history.

(56) References Cited

U.S. PATENT DOCUMENTS

| | | | |
|---|---|---|---|
| 11,017,250 B2* | 5/2021 | Turcot | G06V 40/20 |
| 2016/0217577 A1 | 7/2016 | Tom et al. | |
| 2016/0321809 A1* | 11/2016 | Chukka | G06V 20/695 |
| 2018/0056090 A1* | 3/2018 | Jordan | A61N 5/1039 |

OTHER PUBLICATIONS

Dumble et al. Horizon Profile Detection for Attitude Determination, J. Intell Robot Syst (2012) 68:339-357 (Year: 2012).*

(Continued)

*Primary Examiner* — Richard A Hansell, Jr.
(74) *Attorney, Agent, or Firm* — Finch & Maloney PLLC; Gary McFaline

(57) ABSTRACT

Techniques are provided for image-based estimation of the orientation of an airborne platform. A methodology implementing the techniques according to an embodiment includes rotating an image, provided by a camera on the platform, by a selected rotation angle. The method also includes computing an intensity gradient image based on the rotated image. The method further includes extracting a left quarter segment and a right quarter segment of the intensity gradient image. The method further includes flipping one of the extracted segments about a vertical axis through that segment and comparing the non-flipped segment to the flipped segment to generate a matching score. The comparison may be based on a correlation between the flipped segment and the non-flipped segment. The process may be repeated for additional rotation angles and the rotation angle associated with the highest matching score is selected as the estimated orientation angle of the platform.

20 Claims, 8 Drawing Sheets

(56) References Cited

OTHER PUBLICATIONS

Lu et al. Horizon Detection for Mars Surface Operations, 2017 IEEE Aerospace Conference, Mar. 4-11, 2017, DOI: 10.1109/AERO.2017.7943975 (Year: 2017).*

Ettinger, S. et al. "Towards Fight Autonomy: Vision-Based Horizon Detection for Micro Air Vehicles", Florida Conference on Recent Advances in Robotics, 2002, 7 pages.

Fefilatyev S. et al., "Horizon Detection Using Machine Learning Techniques", IEEE, Proceedings of the 5th International Conference on Machine Learning and Applications (ICMLA'06), 2006, 5 pages.

Praczyk Thomsz, "A quick algorithm for horizon line detection in marine images", Journal of Marine Science and Technology, vol. 23.1, 2018. pp. 164-177.

* cited by examiner

Effect of Rotation
500

Left Quarter
330a

Flipped Right Quarter
360a

Vertical Axis
520

Left Quarter
330b

Flipped Right Quarter
360b

Intensity Gradient
310

Left Quarter
330

Flipped Right
Quarter
360

IMAGE BASED ESTIMATION OF AERIAL PLATFORM ORIENTATION IN ROLL AND PITCH

FIELD OF DISCLOSURE

The present disclosure relates to platform tilt estimation, and more particularly, to clutter resistant image based estimation of aerial platform orientation in roll and pitch.

BACKGROUND

Navigational drift can pose a problem for vehicles/platforms, particularly over open water, when such platforms do not have reliable access to the Global Positioning System (GPS). This drift can result in the platform being well off course when it eventually makes landfall, thus compromising or negating the mission of the platform, especially for missions that require lengthy travel over open water during which the errors accumulate to an unacceptable degree.

Figure 1:
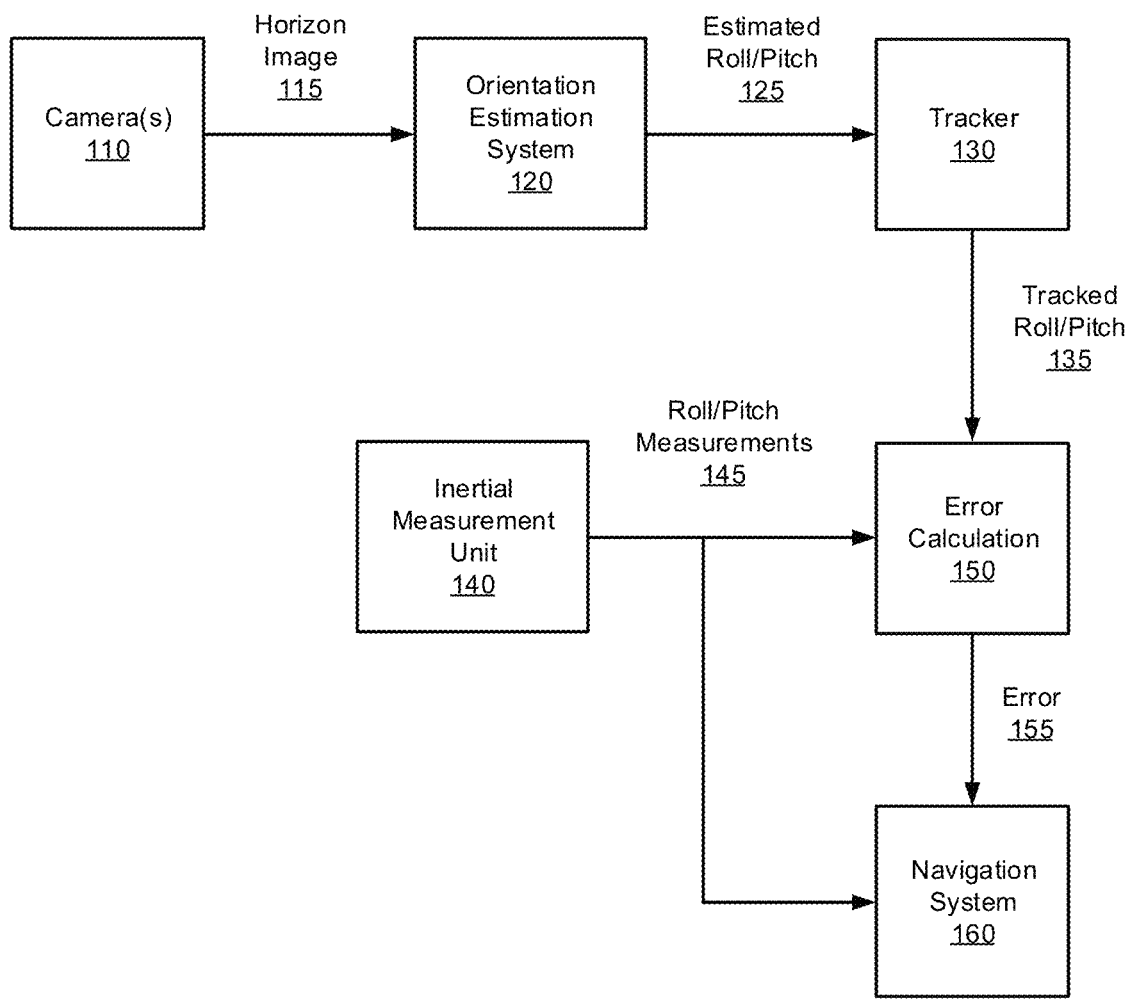
FIG. 1 illustrates a deployment of an orientation estimation system on an airborne platform, configured in accordance with an embodiment of the present disclosure.

Although the following Detailed Description will proceed with reference being made to illustrative embodiments, many alternatives, modifications, and variations thereof will be apparent to those skilled in the art.

DETAILED DESCRIPTION

Techniques are provided for image-based estimation of the orientation (i.e., roll and pitch) of an airborne platform. As noted previously, navigational drift can pose problems for aerial platforms, particularly over open water, when GPS is unavailable or compromised. Inertial navigation systems can accumulate large errors over time, compromising the mission of the platform. Image-based estimation of the roll and/or pitch of the platform based on horizon line angle estimation, according to the techniques disclosed herein, can limit these errors to a significant extent.

In more detail, and according to one such embodiment, the angle of the horizon line can be estimated based on processing of images provided by forward-looking and/or side-looking cameras on the platform. In the case of a forward-looking camera, the estimated horizon line angle provides an indication of the roll of the platform. In the case of a side-looking camera, the estimated horizon line angle provides an indication of the pitch of the platform. Unfortunately, the camera images often include features such as, for example, clouds, glint, fog, terrain, shadows, and other vehicles/objects, which can complicate the estimation of the horizon line. Embodiments of the present disclosure, however, exploit the fact that there is typically an overall symmetry in the variations of grayscale intensity in the images, particularly at the extreme left and right edges of the images. Thus, if a relatively high degree of match is observed in the grayscale intensity between the left and right edges of the image, then that image is probably associated with a level orientation of the platform. If the match is not good, the image can be rotated through various trial angles until an acceptable match is obtained, at which point the trial angle likely corresponds to a level orientation of the platform, and the trial angle represents the orientation of the platform (e.g., roll or pitch). It will be appreciated that these techniques do not assume that the ocean, land, and sky, are generally separable, or that the horizon is physically and optically linear and relatively uninterrupted. Thus, the disclosed techniques provide orientation estimation that is relatively resistant to clutter or other interfering artifacts in the images.

The disclosed techniques can be implemented, for example, in a computing system or a software product executable or otherwise controllable by such systems, although other embodiments will be apparent. In accordance with an embodiment, a methodology to implement these techniques includes rotating an image, provided by a camera on the platform, by a selected trial rotation angle. The method also includes computing an intensity gradient image based on the rotated image. The method further includes extracting a left quarter segment and a right quarter segment of the intensity gradient image. The method further includes flipping one of the extracted segments (either the left quarter or the right quarter) about a vertical axis through the segment and comparing the non-flipped segment to the flipped segment to generate a matching score. The matching score provides an indication of how to closely the flipped segment matches the non-flipped segment. The comparison may be based on a correlation between the flipped segment and the non-flipped segment. The process may be repeated for additional trial rotation angles and the rotation angle associated with the highest matching score is selected as the estimated orientation angle of the platform.

It will be appreciated that the techniques described herein may provide improved estimation of platform orientation for navigation based on horizon line angle estimation compared to existing techniques that rely solely on inertial measurements or on horizon estimation techniques that make assumptions that ocean, land, and sky are separable, and that the horizon is physically and optically linear and uninterrupted. It will further be appreciated that the disclosed techniques may provide improved navigation capability in situations where access to GPS is denied or otherwise unavailable, for example in combat scenarios. The disclosed techniques may further be implemented in hardware or software or a combination thereof.

FIG. 1 illustrates a deployment of an orientation estimation system 120 on an aircraft or other airborne platform 100, configured in accordance with an embodiment of the present disclosure. The platform 100 may be an aircraft (whether manned or unmanned, such as a drone), a guided munition, a projectile, or any other type of intelligent platform capable of air travel. For purposes of this example embodiment and others provided herein, the platform 100 may be referred to as an aircraft, but such reference is not intended to limit the present disclosure as noted above, and as will be appreciated in light of this disclosure. The platform 100 is shown to include one or more cameras 110, an orientation estimation system 120, a tracker 130, an inertial measurement unit 140, an error calculation circuit 150, and a navigation system 160.

The cameras 110 are configured to obtain images 115 looking out from the platform to the horizon. The cameras may be mounted on the platform, such that the provided horizon images 115 are either forward-looking, or side-looking, or both. In some embodiments, the cameras 110 may be configured to provide an electro-optic image, an ultraviolet image, an infrared image, or an image in any other suitable spectral range, or any combination of the above. In some embodiments, the system may employ ultraviolet cameras exclusively.

The orientation estimation system 120 is configured to estimate the orientation (e.g., roll and/or pitch) 125 of the platform based on analysis of the images provided by the camera 110, as will be described in greater detail below.

The tracker 130 is configured to track the estimated orientation over time 135, for example to reduce error. In some embodiments, the tracker 130 may be a Kalman filter tracker, or any other suitable tracker, in light of the present disclosure.

The inertial measurement unit 140 is configured to provide platform roll and pitch measurements 145 that are based on inertial sensor measurements of the platform. Inertial sensors may include gyroscopes, accelerometers, and the like.

The error calculation circuit 150 is configured to calculate an error, for example at each point in time, between the roll/pitch measurements 145, based on the inertial sensors, and the tracked roll/pitch 135, based on the visual images of the horizon 115.

The navigation system 160 is configured to provide navigational functionality to the aircraft platform 100, using the roll and pitch measurements 145 provided by the inertial measurement unit 140. The navigation system 160 is further configured to correct those measurements 145, based on the error terms 155 provided by error calculation circuit 150, which in turn are generated from the image based estimation of the platform orientation, according to the disclosed techniques. Without such corrections, the navigation system can introduce incorrect acceleration components into the position calculations. For example, roll and pitch errors can introduce an error in horizontal acceleration which integrates twice over time during the computation of position. The error corrections provided by the disclosed techniques can reduce or limit the rate of growth of these position errors.

Figure 2:
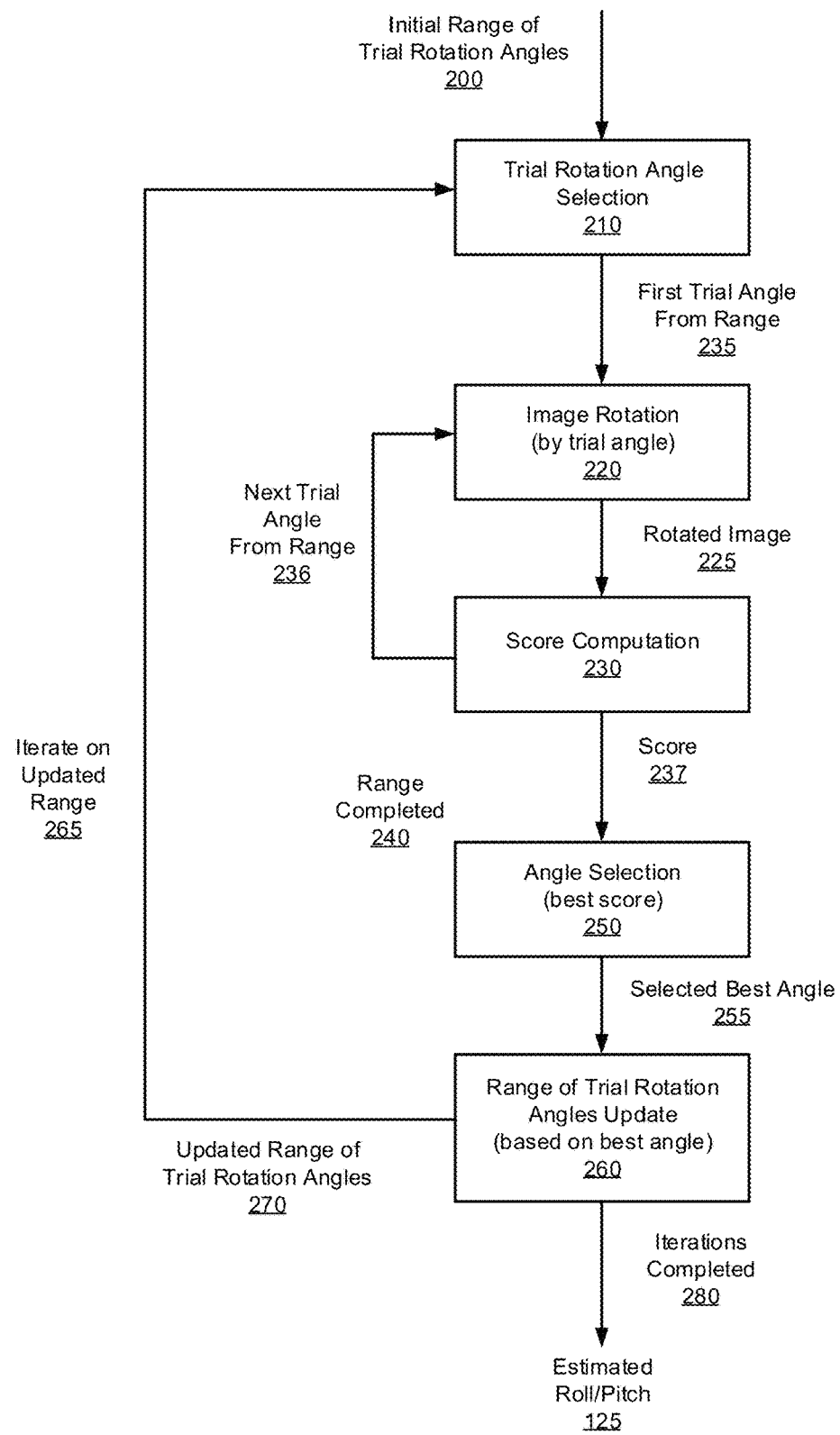
FIG. 2 is a block diagram of the orientation estimation system, configured in accordance with an embodiment of the present disclosure.

FIG. 2 is a block diagram of the orientation estimation system 120, configured in accordance with an embodiment of the present disclosure. The orientation estimation system 120 is shown to include a rotation angle selection circuit 210, an image rotation circuit 220, a score computation circuit 230, an angle selection circuit 250, and an angle range update circuit 260.

The rotation angle selection circuit 210 is configured to select a first trial rotation angle 235 from an initial range of trial rotation angles 200. In some embodiments, the initial range of trial rotation angles 200 spans a range of plausible roll or pitch values for the platform and are coarsely spaced over that range, relative to subsequent iterations as described below.

The image rotation circuit 220 is configured to rotate the image 115 by the selected trial rotation angle to generate a rotated image 225.

The score computation circuit 230 is configured to generate a score 237 associated with the rotated image 225, as will be described in greater detail below. A higher score indicates a greater likelihood that the trial rotation angle is close to the platform orientation angle. The score is saved for the current trial rotation angle 235 and the next trial rotation angle 236 is selected from the range to repeat the process by image rotation circuit 220, until all trial rotation angles have been processed (range completed 240).

The angle selection circuit 250 is configured to select a best rotation angle 255 as the trial rotation angle associated with the highest score.

The angle range update circuit 260 is configured to generate a new and narrower range of trial rotation angles 270 centered about the best rotation angle 255. The new range of trial rotation angles 270 is more finely spaced than the initial range of trial rotation angles 200. The process is iterated on the updated range 265. In some embodiments, the process may be iterated a third (or more) times, with increasingly narrower ranges and finer spacings between trial rotation angles until a target angular resolution is achieved. When the iterations are completed 280, the final selected best rotation angle is used as the estimated roll or pitch of the platform.

Figure 3:
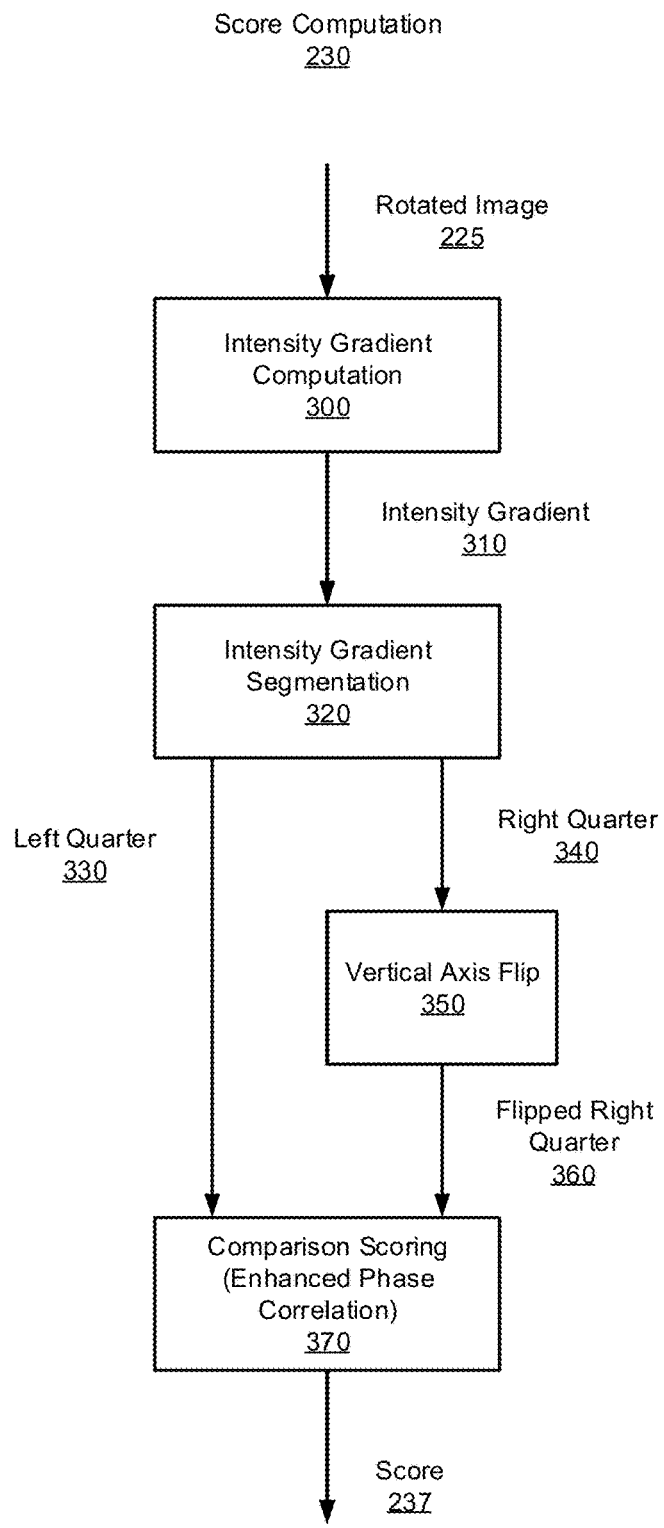
FIG. 3 is a block diagram of the score computation circuit, configured in accordance with an embodiment of the present disclosure.

FIG. 3 is a block diagram of the score computation circuit 230, configured in accordance with an embodiment of the present disclosure. The score computation circuit 230 is shown to include an intensity gradient computation circuit 300, an intensity gradient segmentation circuit 320, a vertical axis flip circuit 350, and a comparison scoring circuit 370.

The intensity gradient computation circuit 300 is configured to compute the intensity gradient 310 of the rotated image 225. In some embodiments, the intensity gradient $G(x,y)$ may be calculated for each pixel $I(x,y)$ of the rotated image 225 as:

$$G(x,y)=\sqrt{(I_x-I_{x+1})^2+(I_y-I_{y+1})^2}$$

In some embodiments, the intensity gradient may be generated using a Sobel transform, or any other suitable technique in light of the present disclosure.

Figure 5:
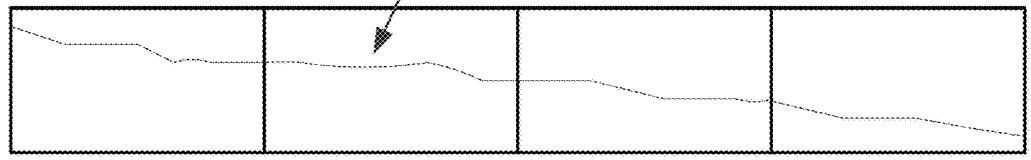
FIG. 5 illustrates rotation effects on a horizon line, for processing in accordance with an embodiment of the present disclosure.
Figure 5:
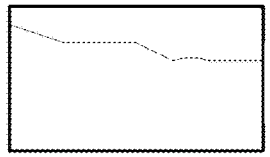
Figure 5:
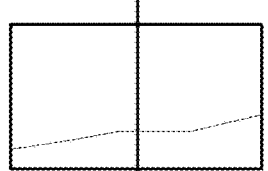
Figure 5:
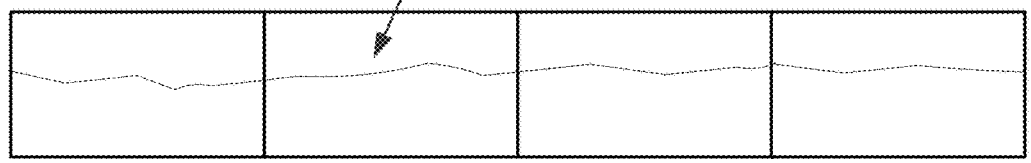
Figure 5:
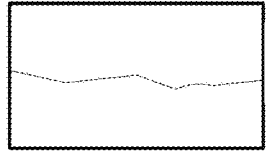
Figure 5:
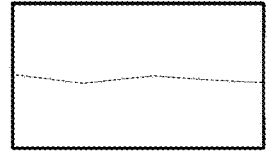

The intensity gradient segmentation circuit 320 is configured to segment the intensity gradient into quarters from left to right, for example as shown in FIG. 5. The leftmost quarter 330 and the rightmost quarter 340 are of interest for the score computation.

The vertical axis flip circuit 350 is configured to flip the right quarter 340 about the vertical axis to generate a flipped right quarter intensity gradient 360. The right quarter is flipped here as an example, but it will be understood that in an alternative embodiment the left quarter can instead be flipped about the vertical axis while leaving the right quarter unmodified. Also, the term "quarter" is used here for simplicity, but in some embodiments, a leftmost portion and a rightmost portion may be segmented, which can each be greater than or less than an exact quarter of the intensity gradient image.

The comparison scoring circuit 370 is configured to compare the left quarter intensity gradient 330 to the flipped right quarter intensity gradient 360 to generate a score that provides an indication of the degree of match between the quarter images.

In some embodiments, the comparison may be based on a correlation (also known as a phase correlation) of the quarter intensity gradients 330, 360. In some embodiments, spectrum whitening, which may increase higher frequency components, can be used to increase the relative strength of edges, which may yield improved performance. Toward this end, a 2-Dimensional correlation surface, CorrSurf, may be generated according to the following example equation:

$$CorrSurf = IFFT\left[\frac{FFT(A) * conj(FFT(B))}{1 + [abs(FFT(A)) * abs(FFT(B))]^\alpha}\right]$$

where A is the left quarter 330 and B is the flipped right quarter 360. FFT denotes a 2-Dimensional Fast Fourier Transform, IFFT denotes an inverse 2-Dimensional Fast Fourier Transform, conj denotes an element-wise conjugate operation, and abs denotes an element-wise absolute value or magnitude operation. The multiplication, division, and addition operations are all element-wise operations (i.e., performed between each corresponding element of the operands of the operation).

The alpha term ($\alpha$) is a value ranging between zero and one and is used to control the degree of spectral whitening. Setting alpha equal to one provides maximum whitening, while an alpha of zero defaults to correlation without whitening. Any value between zero and one may be selected. The score, used to determine the degree of matching between the quarter images, may be based on the value associated with the peak of the correlation surface.

The above equation represents one possible approach to performing phase correlation, and it will be appreciated that many variations are possible. Additionally, in some embodiments, other suitable techniques (e.g., besides correlation techniques) may be used, in light of the present disclosure, to perform the comparison and generate the score.

Figure 4:
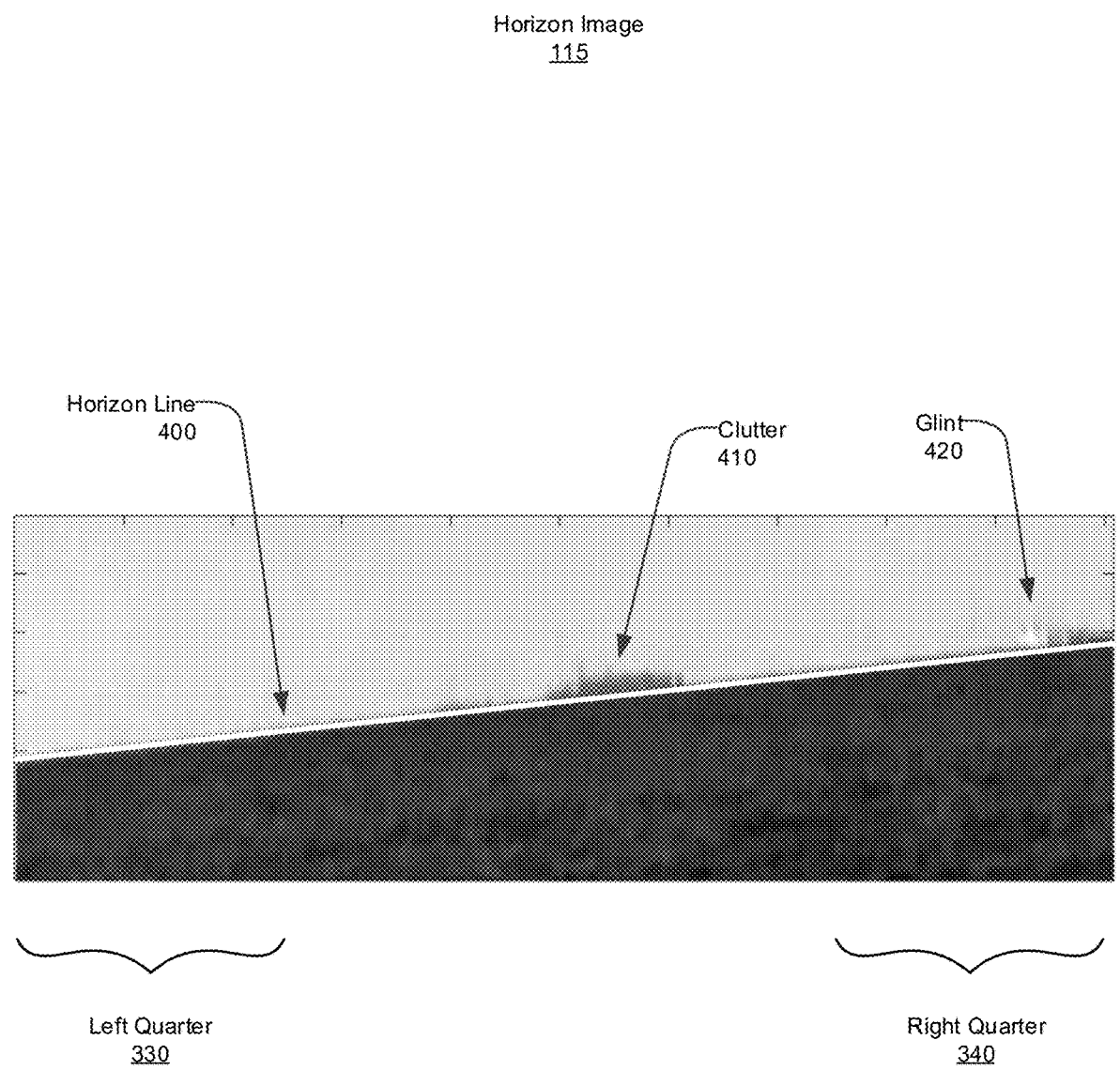
FIG. 4 illustrates a camera image that includes a horizon, in accordance with an embodiment of the present disclosure.

FIG. 4 illustrates a camera image 400 that includes a horizon, in accordance with an embodiment of the present disclosure. The image illustrates a horizon that is indicated by a horizon line 400 (the white line). The image also illustrates clutter 410 and glint 420, artifacts that can cause traditional horizon line estimation techniques to fail. The left quarter 330 and right quarter 340 of the image are also indicated in the figure for reference.

FIG. 5 illustrates rotation effects 500 on a horizon line, for processing in accordance with an embodiment of the present disclosure. A horizon line 510*a* is shown in a simplified illustration of an intensity gradient image 310*a* that was generated at a first trial rotation angle. The left quarter 330*a* and right quarter 340*a* segments are indicated as shown. The flipped right quarter 360*a* is shown, having been flipped about the vertical axis 520 through the segment. A visual comparison of the left quarter 330*a* and the flipped right quarter 360*a* illustrates a relatively significant difference, which probably indicates that this first trial rotation angle is not correct (e.g., does not match the orientation of the platform).

Also shown is intensity gradient image 310*b*, which was generated at a different trial rotation angle. Horizon line 510*b* is shown running through the image 310*b*, and is the same horizon line as 510*a*, but at a different rotation angle. Here again, the left quarter 330*b*, and the right quarter 340*b* are shown, as well as the flipped right quarter 360*b*. A visual comparison of the left quarter 330*b* and the flipped right quarter 360*b* illustrates a greater degree of similarity, which probably indicates that this second trial rotation angle is a better choice for the orientation of the platform.

Figure 6:
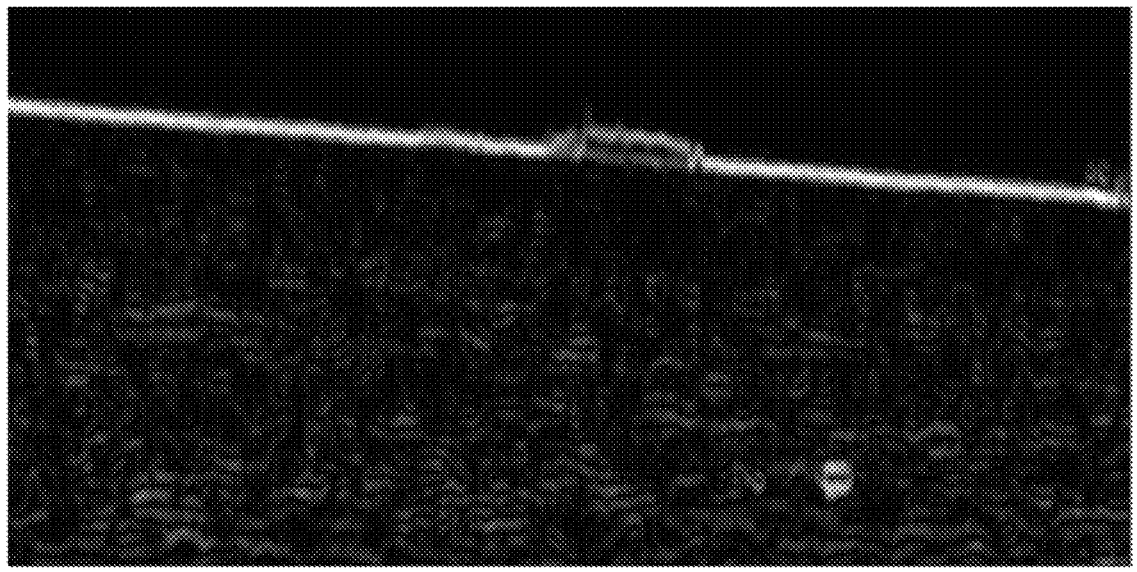
FIG. 6 illustrates an intensity gradient image associated with the camera image of FIG. 4, in accordance with an embodiment of the present disclosure.
Figure 6:
Figure 6:
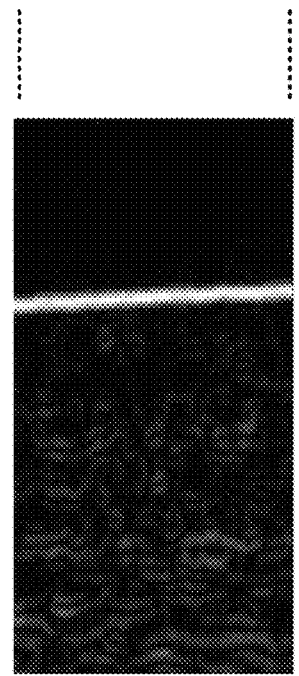

FIG. 6 illustrates an intensity gradient image 310, in accordance with an embodiment of the present disclosure. The intensity gradient image 310 is an actual intensity gradient image (in contrast to the simplified drawing of FIG. 5), generated from the camera image 115 of FIG. 4, although rotated to a different angle. The left quarter segment 330 and the flipped right quarter segment 360 are also shown in the figure.

Methodology

Figure 7:
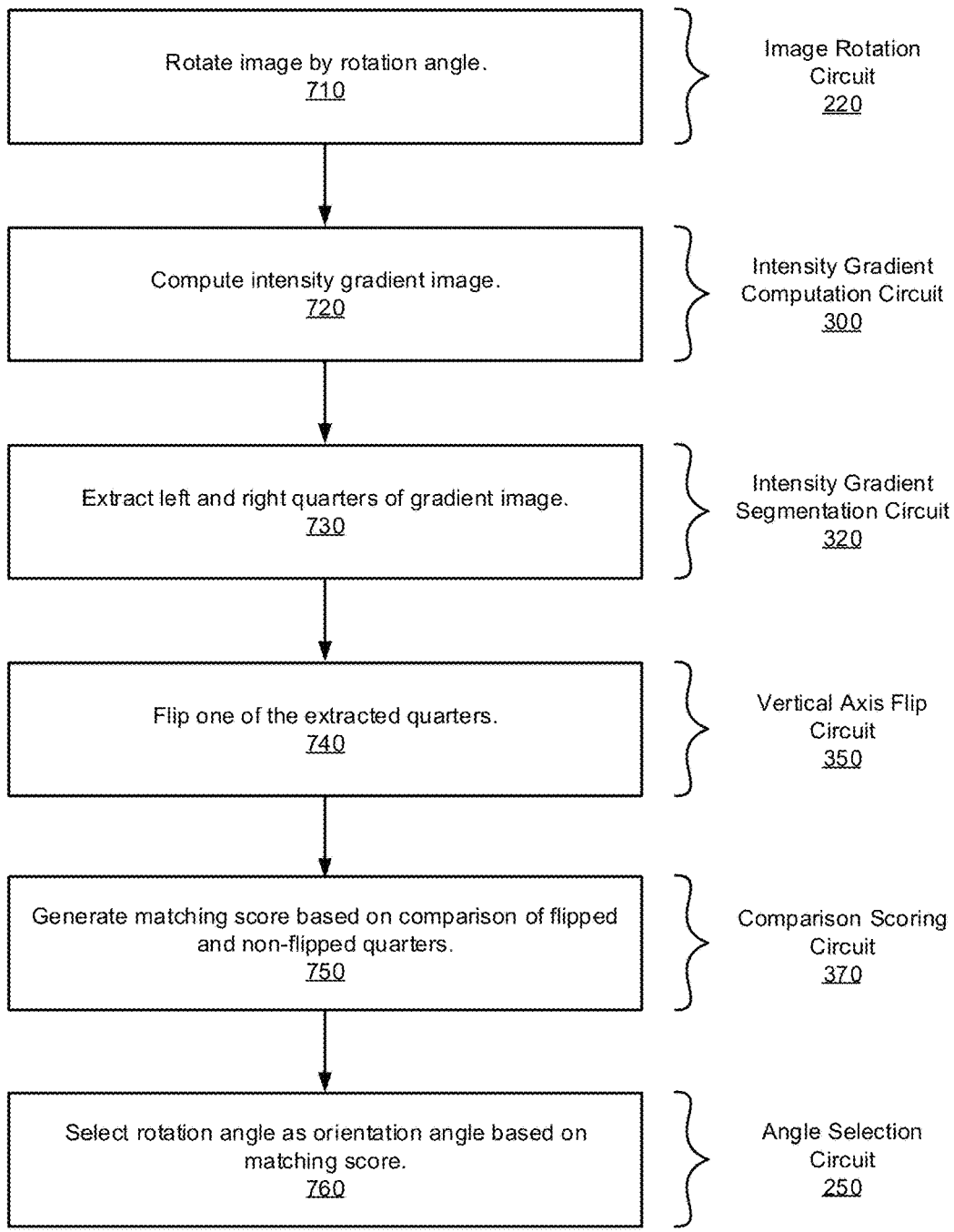
FIG. 7 is a flowchart illustrating a methodology for orientation estimation, in accordance with an embodiment of the present disclosure.

FIG. 7 is a flowchart illustrating a methodology 700 for orientation estimation, in accordance with an embodiment of the present disclosure. As can be seen, example method 700 includes a number of phases and sub-processes, the sequence of which may vary from one embodiment to another. However, when considered in the aggregate, these phases and sub-processes form a process for estimation of platform orientation (e.g., roll and/or pitch), in accordance with certain of the embodiments disclosed herein. These embodiments can be implemented, for example using the system architecture illustrated in FIGS. 1-3, as described above. However other system architectures can be used in other embodiments, as will be apparent in light of this disclosure. To this end, the correlation of the various functions shown in FIG. 7 to the specific components illustrated in FIGS. 1-3 is not intended to imply any structural and/or use limitations. Rather other embodiments may include, for example, varying degrees of integration wherein multiple functionalities are effectively performed by one system. Numerous variations and alternative configurations will be apparent in light of this disclosure.

As illustrated in FIG. 7, in one embodiment method 700 commences, at operation 710, by rotating an image by a selected rotation angle. The image may be provided by a forward-looking or side-looking camera on the platform. In the case of a side-looking camera, the estimated orientation angle is an estimate of the pitch of the platform, while in the case of a forward-looking camera, the estimated orientation angle is an estimate of the roll of the platform.

In some embodiments, the camera may provide an electro-optic image, an ultraviolet image, an infrared image or any combination of an electro-optic image, an ultraviolet image, and an infrared image. Next, at operation 720, an intensity gradient image is computed based on the rotated image.

At operation 730, a first segment of the intensity gradient image is extracted from either a left region or a right region of the intensity gradient image and a second segment of the intensity gradient image is extracted from a region of the intensity gradient image opposite the region associated with the first segment. Said differently, the first segment may be extracted from the left-hand side of the intensity gradient image and the second segment may be extracted from the right-hand side of the intensity gradient image. Alternatively, the first segment may be extracted from the right-hand side of the intensity gradient image and the second segment may be extracted from the left-hand side of the intensity gradient image. In some embodiments, each segment may comprise approximately one quarter of the intensity gradient image.

At operation 740, the second segment is flipped about a vertical axis through the segment. At operation 750, the first segment is compared to the flipped second segment, to generate a matching score which provides an indication of how to closely the first segment matches the flipped second segment.

At operation 760, the rotation angle is selected as an estimated orientation angle of the platform based on the matching score, for example, if the matching score exceeds a threshold value. In some embodiments, the process is repeated over a range of rotation angles, and the rotation angle associated with the highest matching score is selected as the estimated orientation angle. In some embodiments, after repeating the process over a first range of rotation angles in selecting a first estimated orientation angle, the process may be repeated yet again over a new and narrower range of rotation angles centered on the first estimated orientation angle to generate a second and more refined estimated orientation angle. In some embodiments, this process may be repeated still further, over any number of desired times, to continue refining the estimated orientation angle.

Of course, in some embodiments, additional operations may be performed, as previously described in connection with the system. These additional operations may include, for example, performing a correlation to generate the matching score, as previously described. In some embodiments, the estimated orientation angle may be tracked over time and the track may be provided to a navigation system of the platform.

Example Platforms

Figure 8:
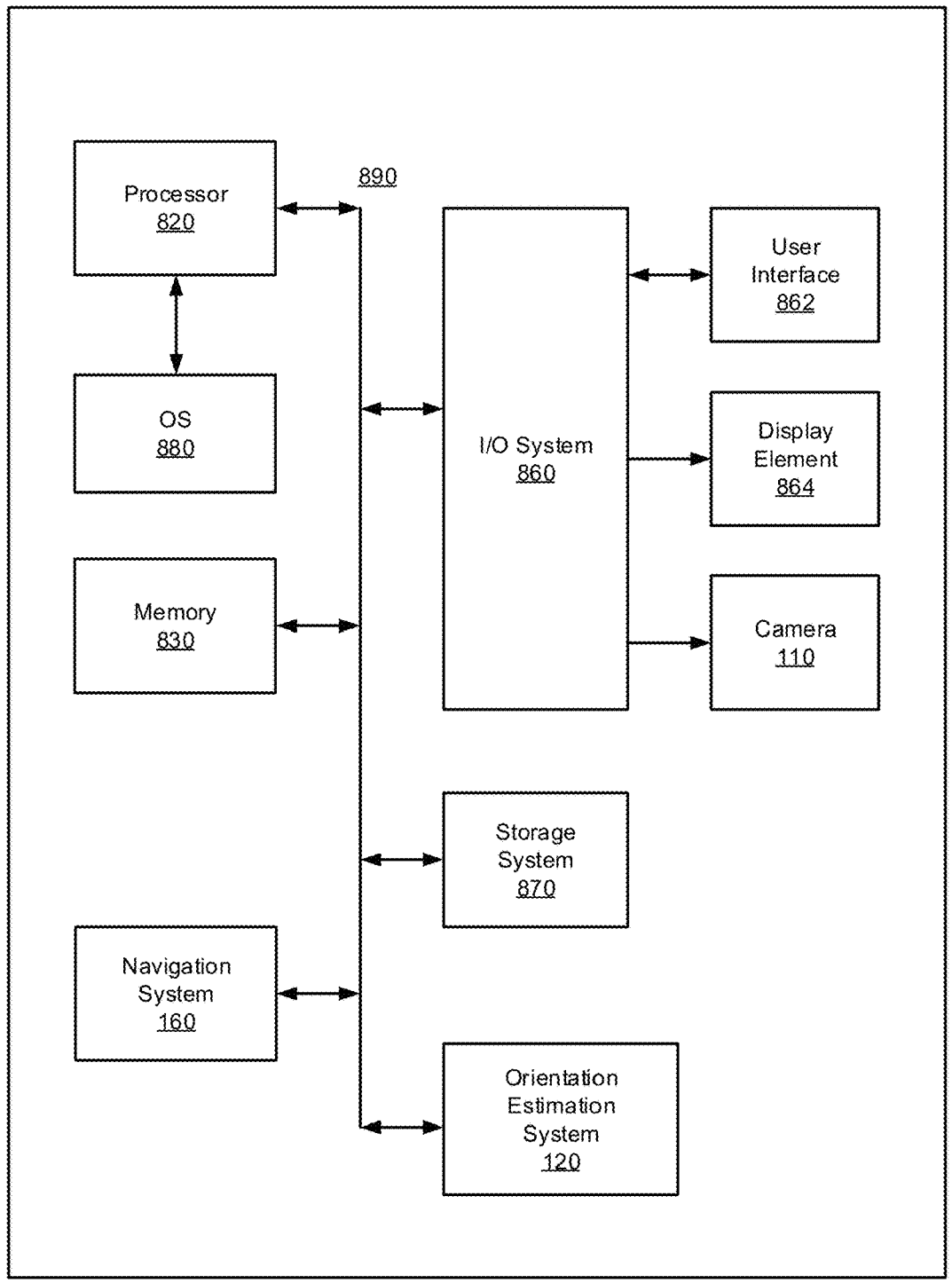
FIG. 8 is a block diagram schematically illustrating a platform configured to perform orientation estimation, in accordance with an embodiment of the present disclosure.

FIG. 8 is a block diagram schematically illustrating a platform 800 configured to perform orientation estimation, in accordance with an embodiment of the present disclosure. In some embodiments, platform 800, or portions thereof, may be hosted on, or otherwise be incorporated into an aircraft (such as an airplane, jet, helicopter, or an unmanned aerial vehicle or drone), a guided munition, or other a projectile (including those with non-lethal payloads), or other intelligent aerial platform.

In some embodiments, platform 800 may comprise any combination of a processor 820, a memory 830, an input/output (I/O) system 860, a user interface 862, a display element 864, camera(s) 110, a storage system 870, navigation system 160, and orientation estimation system 120. As can be further seen, a bus and/or interconnect 890 is also provided to allow for communication between the various components listed above and/or other components not shown. Other componentry and functionality not reflected in the block diagram of FIG. 8 will be apparent in light of this disclosure, and it will be appreciated that other embodiments are not limited to any particular hardware configuration.

Processor 820 can be any suitable processor, and may include one or more coprocessors or controllers, such as an audio processor, a graphics processing unit, or hardware accelerator, to assist in control and processing operations associated with platform 800. In some embodiments, the processor 820 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 820 may be implemented as a complex instruction set computer (CISC) or a reduced instruction set computer (RISC) processor.

Memory 830 can be implemented using any suitable type of digital storage including, for example, flash memory and/or random access memory (RAM). In some embodiments, the memory 830 may include various layers of memory hierarchy and/or memory caches as are known to those of skill in the art. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 820 may be configured to execute an Operating System (OS) 880 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with platform 800, and therefore may also be implemented using any suitable existing or subsequently-developed platform.

I/O system 860 may be configured to interface between various I/O devices and other components of platform 800. I/O devices may include, but not be limited to, user interface 862, display element 864, and camera(s) 110. User interface 862 may include other devices (not shown) such as a touchpad, keyboard, mouse, microphone and speaker, trackball, and scratch pad. I/O system 860 may include a graphics subsystem configured to perform processing of images for rendering on the display element 864. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 820 or any chipset of platform 800.

It will be appreciated that in some embodiments, some of the various components of platform 800 may be combined or integrated in a system-on-a-chip (SoC) architecture. In some embodiments, the components may be hardware components, firmware components, software components or any suitable combination of hardware, firmware or software.

Orientation estimation system 120 is configured to estimate the orientation (e.g., roll and/or pitch) of the platform based on camera provided images that include the horizon, as described previously. Orientation estimation system 120 may include any or all of the circuits/components illustrated in FIGS. 1-3, as described above. These components can be implemented or otherwise used in conjunction with a variety of suitable software and/or hardware that is coupled to or that otherwise forms a part of platform 800. These components can additionally or alternatively be implemented or otherwise used in conjunction with user I/O devices that are capable of providing information to, and receiving information and commands from, a user.

Various embodiments of platform 800 may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chip-sets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, causes one or more of the methodologies disclosed herein to be implemented. Other componentry and functionality not reflected in the illustrations will be apparent in light of this disclosure, and it will be appreciated that other embodiments are not limited to any particular hardware or software configuration. Thus, in other embodiments platform 800 may comprise additional, fewer, or alternative subcomponents as compared to those included in the example embodiment of FIG. 8.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). In some embodiments, the hardware may be modeled or developed using hardware description languages such as, for example Verilog or VHDL. Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, or one or more embedded routines configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads or parallel processes in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), computers, and other processor-based or functional systems. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

One example embodiment of the present disclosure provides a system for estimation of orientation of an aerial platform, the system comprising: an image rotation circuit to rotate an image by a rotation angle, the image capturing a scene within a field of view of the aerial platform; an intensity gradient computation circuit to compute an intensity gradient image based on the rotated image; an intensity gradient segmentation circuit to extract a first segment of the intensity gradient image from one of a left region or a right region of the intensity gradient image, and extract a second segment of the intensity gradient image from a region of the intensity gradient image opposite the region associated with the first segment; an image flipping circuit to flip the second segment about a vertical axis through the second segment; a comparison scoring circuit to compare the first segment to the flipped second segment, the comparison to generate a matching score; and an angle selection circuit to select the rotation angle as an estimated orientation angle of the platform based on the matching score.

In some cases, the comparison is based on a correlation between the first segment and the flipped second segment. In some cases, the image is provided by a side-looking camera of the platform and the estimated orientation angle is an estimate of pitch of the platform. In some cases, the image is provided by a forward-looking camera of the platform and the estimated orientation angle is an estimate of roll of the platform. In some cases, the image is an electro-optic image, an ultraviolet image, an infrared image or any combination of an electro-optic image, an ultraviolet image, and an infrared image. In some cases, the system further comprises a tracking circuit to track the estimated orientation angle over time and provide the track to a navigation system of the platform.

Another example embodiment of the present disclosure provides a computer program product including one or more machine-readable mediums encoded with instructions that when executed by one or more processors cause a process to be carried out for estimation of orientation of an aerial platform, the process comprising: rotating an image by a rotation angle, the image capturing a scene within a field of view of the aerial platform; computing an intensity gradient image based on the rotated image; extracting a first segment of the intensity gradient image from one of a left region or a right region of the intensity gradient image; extracting a second segment of the intensity gradient image from a region of the intensity gradient image opposite the region associated with the first segment; flipping the second segment about a vertical axis through the second segment; comparing the first segment to the flipped second segment, the comparison to generate a matching score; and selecting the rotation angle as an estimated orientation angle of the platform based on the matching score.

In some cases, the comparison is based on a correlation between the first segment and the flipped second segment. In some cases, the image is provided by a side-looking camera of the platform and the estimated orientation angle is an estimate of pitch of the platform. In some cases, the image is provided by a forward-looking camera of the platform and the estimated orientation angle is an estimate of roll of the platform. In some cases, the image is an electro-optic image, an ultraviolet image, an infrared image or any combination of an electro-optic image, an ultraviolet image, and an infrared image. In some cases, the process further comprises repeating the process for one or more additional rotation angles to generate one or more additional matching scores, and selecting a best rotation angle, from among the first rotation angle and the additional rotation angles, as the estimated orientation angle of the platform, wherein the best rotation angle is associated with a highest of the matching scores. In some cases, the process further comprises tracking the estimated orientation angle over time and providing the track to a navigation system of the platform.

Another example embodiment of the present disclosure provides a method for estimation of platform orientation, the method comprising: rotating, by a processor-based system, an image by a rotation angle; computing, by the processor-based system, an intensity gradient image based on the rotated image; extracting, by the processor-based system, a first segment of the intensity gradient image from one of a left region or a right region of the intensity gradient image; extracting, by the processor-based system, a second segment of the intensity gradient image from a region of the intensity gradient image opposite the region associated with the first segment; flipping, by the processor-based system, the second segment about a vertical axis through the second segment; comparing, by the processor-based system, the first segment to the flipped second segment, the comparison to generate a matching score; and selecting, by the processor-based system, the rotation angle as an estimated orientation angle of the platform based on the matching score.

In some cases, the comparison is based on a correlation between the first segment and the flipped second segment. In some cases, the image is provided by a side-looking camera of the platform and the estimated orientation angle is an estimate of pitch of the platform. In some cases, the image is provided by a forward-looking camera of the platform and the estimated orientation angle is an estimate of roll of the platform. In some cases, the image is an electro-optic image, an ultraviolet image, an infrared image or any combination of an electro-optic image, an ultraviolet image, and an infrared image. In some such cases, the method further comprises repeating the process for one or more additional rotation angles to generate one or more additional matching scores, and selecting a best rotation angle, from among the first rotation angle and the additional rotation angles, as the estimated orientation angle of the platform, wherein the best rotation angle is associated with a highest of the matching scores. In some such cases, the method further comprises tracking the estimated orientation angle over time and providing the track to a navigation system of the platform.

Another example embodiment of the present disclosure provides an aircraft comprising the system or the computer program product described above.

Another example embodiment of the present disclosure provides a guided munition comprising the system or the computer program product described above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A system for estimation of orientation of an aerial platform, the system comprising:
    an image rotation circuit to rotate an image by a rotation angle, the image capturing a scene within a field of view of the aerial platform;
    an intensity gradient computation circuit to compute an intensity gradient image based on the rotated image;
    an intensity gradient segmentation circuit to extract a first segment of the intensity gradient image from one of a left region or a right region of the intensity gradient image, and extract a second segment of the intensity gradient image from a region of the intensity gradient image opposite the region associated with the first segment;
    an image flipping circuit to flip the second segment about a vertical axis through the second segment;
    a comparison scoring circuit to compare the first segment to the flipped second segment, the comparison to generate a matching score; and
    an angle selection circuit to select the rotation angle as an estimated orientation angle of the platform based on the matching score.

2. The system of claim 1, wherein the comparison is based on a correlation between the first segment and the flipped second segment.

3. The system of claim 1, wherein the image is provided by a side-looking camera of the platform and the estimated orientation angle is an estimate of pitch of the platform.

4. The system of claim 1, wherein the image is provided by a forward-looking camera of the platform and the estimated orientation angle is an estimate of roll of the platform.

5. The system of claim 1, wherein the image is an electro-optic image, an ultraviolet image, an infrared image or any combination of an electro-optic image, an ultraviolet image, and an infrared image.

6. The system of claim 1, further comprising a tracking circuit to track the estimated orientation angle over time and provide the track to a navigation system of the platform.

7. A computer program product including one or more non-transitory machine-readable mediums encoded with instructions that when executed by one or more processors cause a process to be carried out for estimation of orientation of an aerial platform, the process comprising:
    rotating an image by a rotation angle, the image capturing a scene within a field of view of the aerial platform;
    computing an intensity gradient image based on the rotated image;
    extracting a first segment of the intensity gradient image from one of a left region or a right region of the intensity gradient image;
    extracting a second segment of the intensity gradient image from a region of the intensity gradient image opposite the region associated with the first segment;
    flipping the second segment about a vertical axis through the second segment;
    comparing the first segment to the flipped second segment, the comparison to generate a matching score; and
    selecting the rotation angle as an estimated orientation angle of the platform based on the matching score.

8. The computer program product of claim 7, wherein the comparison is based on a correlation between the first segment and the flipped second segment.

9. The computer program product of claim 7, wherein the image is provided by a side-looking camera of the platform and the estimated orientation angle is an estimate of pitch of the platform.

10. The computer program product of claim 7, wherein the image is provided by a forward-looking camera of the platform and the estimated orientation angle is an estimate of roll of the platform.

11. The computer program product of claim 7, wherein the image is an electro-optic image, an ultraviolet image, an infrared image or any combination of an electro-optic image, an ultraviolet image, and an infrared image.

12. The computer program product of claim 7, further comprising repeating the process for one or more additional rotation angles to generate one or more additional matching scores, and selecting a best rotation angle, from among the first rotation angle and the additional rotation angles, as the estimated orientation angle of the platform, wherein the best rotation angle is associated with a highest of the matching scores.

13. The computer program product of claim 7, further comprising tracking the estimated orientation angle over time and providing the track to a navigation system of the platform.

14. A method for estimation of platform orientation, the method comprising:
    rotating, by a processor-based system, an image by a rotation angle;
    computing, by the processor-based system, an intensity gradient image based on the rotated image;
    extracting, by the processor-based system, a first segment of the intensity gradient image from one of a left region or a right region of the intensity gradient image;
    extracting, by the processor-based system, a second segment of the intensity gradient image from a region of the intensity gradient image opposite the region associated with the first segment;

flipping, by the processor-based system, the second segment about a vertical axis through the second segment;

comparing, by the processor-based system, the first segment to the flipped second segment, the comparison to generate a matching score; and selecting, by the processor-based system, the rotation angle as an estimated orientation angle of the platform based on the matching score.

15. The method of claim 14, wherein the comparison is based on a correlation between the first segment and the flipped second segment.

16. The method of claim 14, wherein the image is provided by a side-looking camera of the platform and the estimated orientation angle is an estimate of pitch of the platform.

17. The method of claim 14, wherein the image is provided by a forward-looking camera of the platform and the estimated orientation angle is an estimate of roll of the platform.

18. The method of claim 14, wherein the image is an electro-optic image, an ultraviolet image, an infrared image or any combination of an electro-optic image, an ultraviolet image, and an infrared image.

19. The method of claim 14, further comprising repeating the process for one or more additional rotation angles to generate one or more additional matching scores, and selecting a best rotation angle, from among the first rotation angle and the additional rotation angles, as the estimated orientation angle of the platform, wherein the best rotation angle is associated with a highest of the matching scores.

20. The method of claim 14, further comprising tracking the estimated orientation angle over time and providing the track to a navigation system of the platform.

* * * * *